United States Patent
Kusumura et al.

(10) Patent No.: US 10,885,011 B2
(45) Date of Patent: Jan. 5, 2021

(54) INFORMATION PROCESSING SYSTEM, DESCRIPTOR CREATION METHOD, AND DESCRIPTOR CREATION PROGRAM

(71) Applicant: dotData, Inc., San Mateo, CA (US)

(72) Inventors: Yukitaka Kusumura, Tokyo (JP); Ryohei Fujimaki, Tokyo (JP)

(73) Assignee: dotData, Inc., San Mateo, CA (US)

( * ) Notice: Subject to any disclaimer, the term of this patent is extended or adjusted under 35 U.S.C. 154(b) by 168 days.

(21) Appl. No.: 15/774,645

(22) PCT Filed: Nov. 14, 2016

(86) PCT No.: PCT/JP2016/083680
§ 371 (c)(1),
(2) Date: May 9, 2018

(87) PCT Pub. No.: WO2017/090475
PCT Pub. Date: Jun. 1, 2017

(65) Prior Publication Data
US 2018/0373764 A1 Dec. 27, 2018

Related U.S. Application Data

(60) Provisional application No. 62/259,896, filed on Nov. 25, 2015.

(51) Int. Cl.
*G06F 16/22* (2019.01)
*G06F 16/2458* (2019.01)
(Continued)

(52) U.S. Cl.
CPC ...... *G06F 16/2282* (2019.01); *G06F 16/2433* (2019.01); *G06F 16/2465* (2019.01); *G06F 16/24573* (2019.01); *G06N 20/00* (2019.01)

(58) Field of Classification Search
CPC ............. G06F 16/2465; G06F 16/2282; G06F 16/2433; G06F 16/24573
See application file for complete search history.

(56) References Cited

U.S. PATENT DOCUMENTS 7,225,200 B2   5/2007   Chickering et al.
8,731,881 B2   5/2014   Fujimaki et al.
(Continued)

FOREIGN PATENT DOCUMENTS

JP   H11219367 A   8/1999
JP   2002-7435     1/2002
(Continued)

OTHER PUBLICATIONS

Swati Thacker et al., "Oracle Fusion Middleware", Oracle Reports User's Guide to Building Reports 11g Release 1 (11.1.), Jul. 31, 2013 (Jul. 31, 2013), XP055659020, Retrieved from the Internet: URL:https:// docs.oracle.com/middleware/11119/classic/build-reports/B32122-03.pdf [retrieved on Jan. 17, 2020], 776 pages
(Continued)

*Primary Examiner* — James Trujillo
*Assistant Examiner* — Michal Bogacki (57) ABSTRACT

A table storage unit 81 stores a first table including an objective variable and a second table different in granularity from the first table. A descriptor creation unit 82 creates a feature descriptor for generating a feature which is a variable that can influence the objective variable, from the first table and the second table. The descriptor creation unit 82 creates a plurality of feature descriptors, each by generating a combination of a mapping condition element indicating a mapping condition for rows in the first table and the second table and a reduction method element indicating a reduction method for reducing, for each objective variable, data of each column included in the second table.

13 Claims, 7 Drawing Sheets

(51) Int. Cl.
  *G06F 16/2457* (2019.01)
  *G06F 16/242* (2019.01)
  *G06N 20/00* (2019.01)

(56) References Cited

U.S. PATENT DOCUMENTS

| | | | |
|---|---|---|---|
| 9,130,832 | B1* | 9/2015 | Boe .................. G06F 16/24 |
| 9,146,984 | B1* | 9/2015 | Bozkaya ............ G06F 16/2452 |
| 10,452,632 | B1* | 10/2019 | Simmen ............ G06F 16/285 |
| 2002/0147599 | A1 | 10/2002 | Vishnubhotla |
| 2004/0153250 | A1 | 8/2004 | Hurst et al. |
| 2005/0102303 | A1 | 5/2005 | Russell et al. |
| 2006/0218132 | A1 | 9/2006 | Mukhin et al. |
| 2007/0203893 | A1* | 8/2007 | Krinsky ............... G06F 16/951 |
| 2008/0263093 | A1* | 10/2008 | Alcorn ................ G06F 9/542 |
| 2011/0302187 | A1 | 12/2011 | Otsuka et al. |
| 2012/0054174 | A1 | 3/2012 | Gagnier et al. |
| 2013/0246996 | A1* | 9/2013 | Duggal ................ G06F 8/20 717/104 |
| 2014/0136471 | A1* | 5/2014 | Kumar ................ G06F 16/00 707/602 |
| 2014/0188918 | A1* | 7/2014 | Shamlin ............. G06F 16/2465 707/756 |
| 2014/0279074 | A1* | 9/2014 | Chen .................. G06Q 30/0269 705/14.73 |
| 2015/0310082 | A1* | 10/2015 | Han ..................... G06F 16/283 707/602 |
| 2015/0379428 | A1* | 12/2015 | Dirac .................. G06N 20/00 706/12 |
| 2016/0232213 | A1 | 8/2016 | Morinaga et al. |
| 2016/0342606 | A1* | 11/2016 | Le Mouel .......... G06F 16/2465 |
| 2017/0109629 | A1 | 4/2017 | Kusumura et al. |
| 2017/0213158 | A1 | 7/2017 | Muraoka et al. |
| 2020/0057948 | A1 | 2/2020 | Fujimaki et al. |
| 2020/0301921 | A1 | 9/2020 | Chen et al. |
| 2020/0334246 | A1 | 10/2020 | Chen et al. |

FOREIGN PATENT DOCUMENTS

| | | |
|---|---|---|
| JP | 2002109150 A | 4/2002 |
| JP | 2005302040 A | 10/2005 |
| JP | 2008102736 A | 5/2008 |
| JP | 2011-242851 | 12/2011 |
| JP | 2011257812 A | 12/2011 |
| JP | 2012059173 A | 3/2012 |
| JP | 2013152656 A | 8/2013 |
| JP | 2013164724 A | 8/2013 |
| JP | 2013182498 A | 9/2013 |
| JP | 2013542478 A | 11/2013 |
| JP | 2015-75970 | 4/2015 |
| WO | WO0065484 A2 | 11/2000 |
| WO | WO2012025493 A1 | 3/2012 |
| WO | WO2012128207 A1 | 9/2012 |
| WO | WO2014208205 A | 12/2014 |
| WO | WO 2015/045318 | 4/2015 |
| WO | WO2015186278 A1 | 12/2015 |
| WO | WO2016017086 A1 | 2/2016 |
| WO | WO2017090475 A1 | 6/2017 |

OTHER PUBLICATIONS

Zaman et al., "Modeling and querying multidimensional data sources in Siebel Analytics", SIGMOD 2005: Proceedings of the ACM SIGMOD International Conference on Management of Data; Baltimore, Maryland, Jun. 14-16, 2005, Association for Computing Machinery, New York, NY, Jun. 14, 2005 (Jun. 14, 2005), pp. 822-827 (6 pages).

International Search Report dated Jan. 17, 2017, in corresponding PCT International Application.

StatSlice Systems "Excel at Data Mining—Connecting to a SQL Data Source", Youtube, Jul. 18, 2014, URL: https://www.youtube.com/watch?v=7RYbDWa9or8 [retrieved on Jun. 1, 2019].

Extended European Search Report dated Jun. 28, 2019, issued in counterpart European Patent Application No. 16868423.1.

Nakamura, Shirou et al., "Practical Methods for Constructing Data Warehouse," Nikkei Computer, (non-official translation) Sep. 15, 1997 (Sep. 15, 1997), pp. 237-249.

Nakamura, Shirou et al., "Practical Methods for Constructing Data Warehouse," Nikkei Computer, (non-official translation) Sep. 15, 1997 (Sep. 15, 2997), pp. 237-249.

Samorani et al., "A Randonmized Exhaustive Propositionalization Approach for Molecule Classification", Leeds School of Business, University of Colorado at Boulder, UCB 419, Boulder, Colorado 80309-0419, 27 pages.

Samorani et al., "Data Mining for Enhanced Operations Management Decision Making: Applications in Health Care", Department of Operations and Information Management, 2012, 159 pages.

* cited by examiner

TARGET TABLE (T)

| CUSTOMER ID (text) | PLAN (text) | DEVICE (text) | CANCELLATION (int) |
|---|---|---|---|
| 0001 | P1 | APhone | 1 |
| 0002 | P2 | APhone | 0 |
| 0003 | P1 | BPhone | 1 |
| 0004 | P2 | BPhone | 1 |
| ... | ... | ... | ... |

SOURCE TABLE (S)

| CUSTOMER ID (text) | TIME (datetime) | CALL DIRECTION(text) | TYPE (text) | CALL DURATION [s] (int) |
|---|---|---|---|---|
| 0001 | 2010-1-1 10:30:00 | IN | SMS | 0 |
| 0001 | 2010-1-1 11:15:00 | OUT | call | 65 |
| 0001 | 2010-1-1 16:00:00 | OUT | call | 56 |
| 0001 | 2010-1-5 19:30:00 | IN | SMS | 80 |
| 0001 | 2010-1-5 21:30:00 | OUT | call | 50 |
| 0002 | 2010-1-1 10:30:00 | OUT | call | 60 |
| ... | ... | ... | ... | ... | filter DEFINITION
・F LIST

| CONDITIONAL EXPRESSION |
|---|
| CALL DIRECTION=IN |
| CALL DIRECTION=OUT |
| TYPE=SMS |
| TYPE=call |
| HOUR(TIME)<7 |
| HOUR(TIME)>7 and HOUR(TIME)<12 |
| CALL DIRECTION=IN and TYPE=SMS |
| CALL DIRECTION=IN and TYPE=call |
| CALL DIRECTION=IN and HOUR(TIME)<7 |
| CALL DIRECTION=IN and HOUR(TIME)>7 and HOUR(TIME)<12 |
| ... |
| TYPE=call and CALL DIRECTION=IN and HOUR(TIME)>7 and HOUR(TIME)<12 |

18 TYPES map DEFINITION
・M LIST

| T COLUMN NAME | S COLUMN NAME |
|---|---|
| CUSTOMER ID | CUSTOMER ID |

1 TYPE reduce DEFINITION
・R LIST

| COLUMN NAME | REDUCTION FUNCTION |
|---|---|
| CALL DURATION | COUNT |
| CALL DURATION | MEAN |
| CALL DURATION | MAX |
| CALL DURATION | MIN |
| CALL DURATION | VAR |
| TIME | MAX |

6 TYPES

COMBINATION

F (CALL DIRECTION=IN) –M (CUSTOMER ID, CUSTOMER ID)
–R (CALL DURATION, COUNT)

...

F (CALL DIRECTION=OUT and TYPE=call) –M (CUSTOMER ID, CUSTOMER ID)
–R (TIME, MAX)

TEMPLATE                                                                 Temp

SELECT T.$M.T COLUMN NAME, $R. REDUCTION FUNCTION
($R. COLUMN NAME) from T
LEFT JOIN (select* from S where F. CONDITIONAL EXPRESSION) as Temp
on T. $M. T COLUMN NAME=Temp. $M. S COLUMN NAME group by T. $M. T
COLUMN NAME

Q1

SELECT T. CUSTOMER ID, COUNT(CALL DURATION) from T
LEFT JOIN (select* from S where CALL DIRECTION=IN) as Temp
on T. CUSTOMER ID=Temp. CUSTOMER ID group by T. CUSTOMER ID

Q2

SELECT T. CUSTOMER ID, MAX(TIME) from T LEFT JOIN
(select* from S where CALL DIRECTION=OUT and TYPE=call) as
Temp on T. CUSTOMER ID=Temp. CUSTOMER ID group by T. CUSTOMER ID

FIG. 7

FIG.8 filter DEFINITION
· F LIST

| COLUMN NAME | CONDITIONAL EXPRESSION |
|---|---|
| CALL DIRECTION | CALL DIRECTION=IN |
| CALL DIRECTION | CALL DIRECTION=OUT |
| TYPE | TYPE=SMS |
| TYPE | TYPE=call |
| TIME | HOUR(TIME)<7 |
| TIME | HOUR(TIME)>7 and HOUR(TIME)<12 |

CONDITIONAL EXPRESSION
MAXIMUM LENGTH = 2

→ 6+3×4 →

| CONDITIONAL EXPRESSION |
|---|
| CALL DIRECTION=IN |
| CALL DIRECTION=OUT |
| TYPE=SMS |
| TYPE=call |
| HOUR(TIME)<7 |
| HOUR(TIME)>7 and HOUR(TIME)<12 |
| CALL DIRECTION=IN and TYPE=SMS |
| CALL DIRECTION=IN and TYPE=call |
| CALL DIRECTION=IN and HOUR(TIME)<7 |
| CALL DIRECTION=IN and HOUR(TIME)>7 and HOUR(TIME)<12 |
| ... |
| TYPE=call and CALL DIRECTION=IN and HOUR(TIME)>7 and HOUR(TIME)<12 |

18 TYPES

INFORMATION PROCESSING SYSTEM, DESCRIPTOR CREATION METHOD, AND DESCRIPTOR CREATION PROGRAM

CROSS-REFERENCE TO RELATED PATENT APPLICATIONS

This application is a National Stage Entry of International Application No. PCT/JP2016/083680, filed Nov. 14, 2016, which claims the benefit of priority from U.S. Provisional Application No. 62/259,896, filed Nov. 25, 2015. The entire contents of the above-referenced applications are expressly incorporated herein by reference.

TECHNICAL FIELD

The present invention relates to an information processing system, a descriptor creation method, and a descriptor creation program for generating features used in learning or prediction.

BACKGROUND ART

Data mining is a technique of finding heretofore unknown useful knowledge from among a large amount of information. A process of applying data mining to a specific example can be roughly divided into the following three stages.

The first stage (step) is a "pre-processing stage". The "pre-processing stage" is a stage in which, for effective functioning of a data mining algorithm, attributes features)) input to a device or the like that operates according to the data mining algorithm are processed to convert the attributes into new attributes.

The second stage is an "analytical processing stage". The "analytical processing stage" is a stage in which the attributes are input to the device or the like that operates according to the data mining algorithm, and an analysis result output from the device or the like that operates according to the data mining algorithm is obtained.

The third stage is a "post-processing stage", The "post-processing stage" is a stage in which the analysis result is converted into an easy-to-view graph, a control signal to be input to another device, or the like.

To obtain useful knowledge by data mining, the "pre-processing stage" needs to be performed appropriately. The work of designing how to execute the "pre-processing stage" relies on the skills of an experienced technician (data scientist) of the analysis technique. The design work for the pre-processing stage is not fully supported by information processing technology, and still relies greatly on trial and error by the manual work of the experienced technician.

To find unknown useful knowledge, it is important to generate more attribute candidates. In detail, it is important to generate more candidates for an attribute (explanatory variable) that can influence a variable (objective variable) which is a prediction object. Generating more candidates increases the possibility that an attribute helpful in prediction is included in the candidates.

For example, Patent Literature (PTL) 1 describes a method of generating a plurality of attributes. The method described in PTL 1 selects a plurality of attributes from one data set associating attributes such as height, weight, and annual consumption of beer with identifiers of a plurality of persons, and generates a new attribute.

CITATION LIST

Patent Literature

PTL 1: International Patent Application Publication No. 2015/045318

SUMMARY OF INVENTION

Technical Problem

With the method described in PTL 1, a plurality of attribute candidates are generated using one set of table data such as the data set described as an example. The present inventors, however, consider that it is preferable to use not only one set of table data but a plurality of sets of table data, in order to generate many attribute candidates. This is because the use of various table data enables the generation of more attribute candidates. Note that "attribute" is also referred to as "feature".

However, all sets of table data rarely have the same granularity for one prediction object. In detail, since each set of table data differs in contents depending on the property of data collected, there are table data that has a plurality of corresponding rows for each prediction object, and table data in which the correspondence relationship with a prediction object is not obvious.

It is therefore not easy to generate features by simply using a plurality of sets of table data. There is also a technical problem in that it requires a tremendous labor for an experienced technician to define a processing method for each feature to be generated. In view of these circumstances, it is desirable if many feature candidates can be generated efficiently even in the case of using a plurality of sets of table data.

The present invention accordingly has an object of providing an information processing system, a descriptor creation method, and a descriptor creation program that can efficiently generate many feature candidates using a plurality of sets of table data.

Solution to Problem

An information processing system according to the present invention includes: a table storage unit for storing a first table including an objective variable and a second table including data different in granularity from data included in the first table; and a descriptor creation unit for creating a feature descriptor for generating a feature which is a variable that can influence the objective variable, from the data in the first table and the data in the second table, wherein the descriptor creation unit creates a plurality of feature descriptors, each by generating a combination of a mapping condition element indicating a mapping condition for rows in the first table and the second table and a reduction method element indicating a reduction method for reducing, for each objective variable, data included in the second table.

A descriptor creation method according to the present invention includes creating, from a first table including an objective variable and a second table including data different in granularity from data included in the first table, a feature descriptor for generating a feature which is a variable that can influence the objective variable, wherein in the creation of the feature descriptor, a plurality of feature descriptors are created each by generating a combination of a mapping condition element indicating a mapping condition for rows in the first table and the second table and a reduction method element indicating a reduction method for reducing, for each objective variable, data included in the second table.

A descriptor creation program according to the present invention causes a computer to execute a descriptor creation process of creating, from a first table including an objective variable and a second table including data different in granularity from data included in the first table, a feature descriptor for generating a feature which is a variable that can influence the objective variable, wherein in the descriptor creation process, a plurality of feature descriptors are created each by generating a combination of a mapping condition element indicating a mapping condition for rows in the first table and the second table and a reduction method element indicating a reduction method for reducing, for each objective variable, data included in the second table.

Advantageous Effects of Invention

According to the present invention, a technical advantageous effect of efficiently generating many feature candidates using a plurality of sets of table data is achieved by the above-mentioned technical means.

DESCRIPTION OF EMBODIMENT

Exemplary embodiments of the present invention are described below, with reference to drawings. In the following description, the simple term "data" denotes the contents of each cell included in a table, and the term "table data" denotes the whole data included in a table.

Exemplary Embodiment 1

Figure 1:
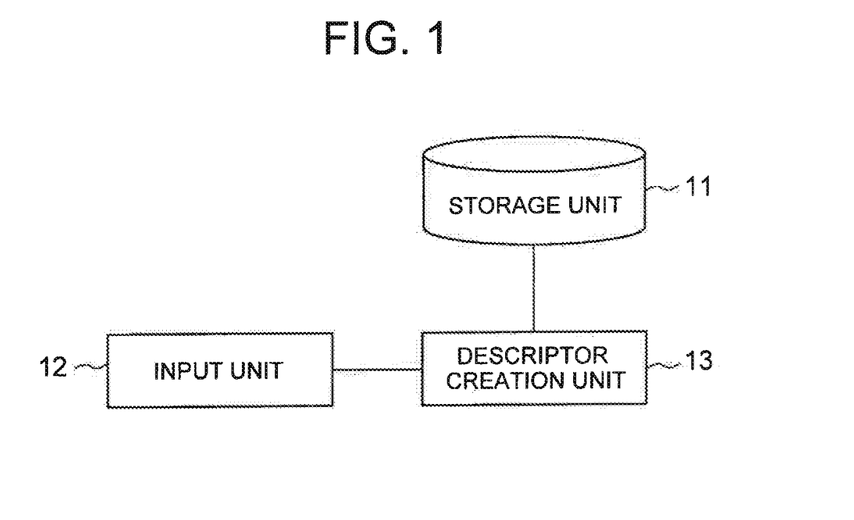
FIG. 1 is a block diagram depicting an example of the structure of Exemplary Embodiment 1 of an information processing system according to the present invention.

FIG. 1 is a block diagram depicting an example of the structure of Exemplary Embodiment 1 of an information processing system according to the present invention. The information processing system in this exemplary embodiment includes a storage unit 11, an input unit 12, and a descriptor creation unit 13.

The storage unit 11 stores a table (hereafter also referred to as "first table") including a column of prediction objects (i.e. objective variables), and a set of data (hereafter also referred to as "first table data") included in the first table. In the following description, the first table is referred to as "target table". The storage unit 11 also stores' a table (hereafter also referred to as "second table") different in granularity from the first table, and a set of data (hereafter also referred to as "second table data") included in the second table. In the following description, the second table is referred to as "source table".

The first table and the second table are each defined by a combination of columns representing data attributes. Each table includes one or more rows combining data indicating values of respective attributes. The "table different in granularity from the target table (first table)" means such a table whose rows do not correspond one-to-one with the rows of the target table. When generating the below-mentioned feature descriptors, the storage unit 11 may not store the first table data and the second table data.

The input unit 12 receives various information necessary for the below-mentioned descriptor creation unit 13 to create feature descriptors. The input unit 12 may receive the information via a communication network (not depicted), or receive the information by reading the information from a storage device (not depicted) storing them. The storage unit 11 may also serve as this storage device. The information received by the input unit 12 is described below, with the functions of the descriptor creation unit 13.

The descriptor creation unit 13 generates a feature descriptor using the information input to the input unit 12. The feature descriptor is a function used to generate a feature which is a variable that can influence an objective variable, from the first table data and the second table data. The number of source tables is not limited to one, and may be two or more. The generated feature is a candidate for an explanatory variable when generating a model using machine learning. In other words, by using the feature descriptor generated in this exemplary embodiment, a candidate for an explanatory variable when generating a model using machine learning can be automatically generated.

The descriptor creation unit 13 creates a plurality of feature descriptors, each by generating a combination of three elements. A first element is an element indicating a filtering condition for a row included in the second table. In the following description, the first element is also referred to as "filtering condition element". In detail, the filtering condition indicated by the first element is defined as a conditional expression for the source table (second table). A process of filtering a row from the second table based on the first element is hereafter also denoted as "filter", A list of conditional expressions is hereafter also denoted as "F list".

The filtering condition may be any condition. An example is a condition of determining whether or not a value is equal to (greater than or less than) a designated column value.

A second element is an element indicating a mapping condition for rows in the first table data and the second table data. In the following description, the second element is also referred to as "mapping condition element". In detail, the second element is defined as a column pair associating a column in the target table (first table) and a column in the source table (second table). A process of associating columns of the respective tables based on the second element is hereafter also denoted as "map". A list of column pairs is hereafter also denoted as "M list". Associating columns of the respective tables by map can be regarded as joining the plurality of tables into one table in the associated columns.

A third element is an element indicating a reduction method for reducing, for each objective variable, data of each column in the second table. In the following description, the third element is also referred to as "reduction method element". In detail, the third element is defined as a reduction function for a column in the source table (second table). A process of reducing data of each column by the method indicated by the third element is hereafter also denoted as "reduce", A list of reduction functions is hereafter also denoted as "R list". In Exemplary Embodiment 1, "reduction for each objective variable" means reducing, from a column included in the second table, data that is filtered based on the first element (i.e. filtering condition element) and associated with the same column in the first table based on the second element (i.e. mapping condition element).

The reduction method may be any method. Examples include the total number, maximum value, minimum value, mean value, median value, and variance of the column. When counting the total number of the column, overlapping data may be excluded or not excluded.

Figure 2:
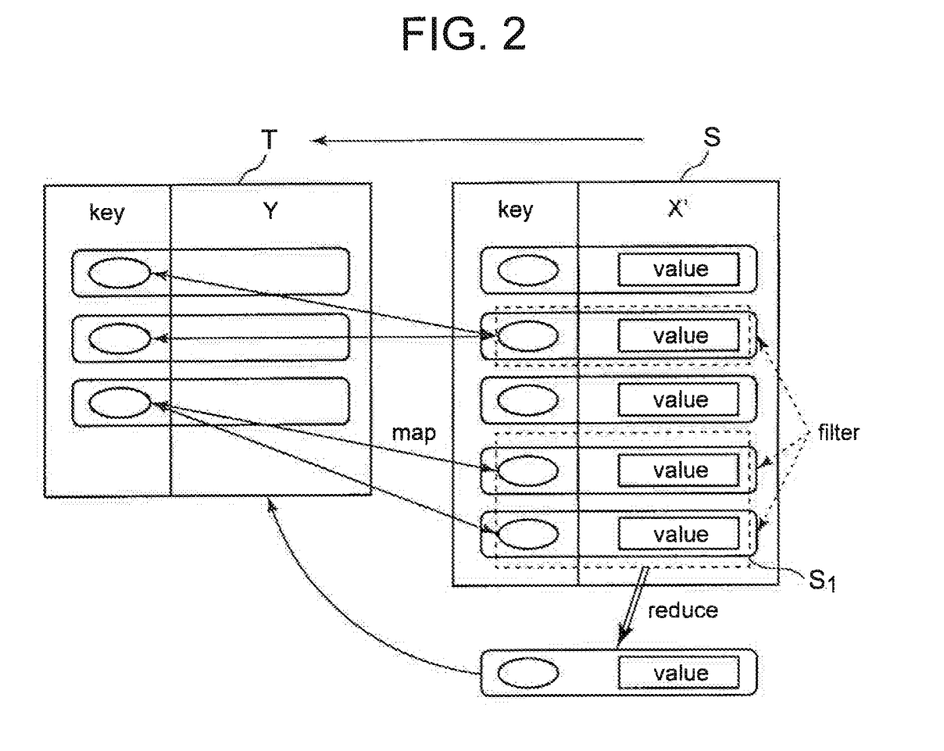
FIG. 2 is an explanatory diagram depicting an example of a process indicated by each element.

FIG. 2 is an explanatory diagram depicting an example of a process indicated by each element. In the example depicted in FIG. 2, one target table T and one source table S are present, and key column is a column associating the two tables. Y column in the target table includes an objective variable. In FIG. 2, $S_1$ is a subset of the set of columns in the source table S.

"filter" is a process of selecting a subset of the set of columns in the source table S. "map" is a process of associating a row in the target table T and a row in the source table S. "reduce" is a process of deriving one value by performing some kind of reduction operation using values of a set of rows selected by filter in the column in the source table S associated by map for each row in the target table T, and any reduction function is used for the derivation.

A feature descriptor having the three elements as parameters is defined as a descriptor for generating a feature based on the following processes. First, One or more rows are extracted from the source table, based on the filtering condition for the source table designated by the first element (filter).

Following this, the target table and the source table are associated with each other, through the mapping condition designated by the second element (map). When associating the target table and the source table, not only rows completely matching in column value indicated by the mapping condition but also rows according to designated similarity may be associated with each other. As an example, when performing association by date and time data, not only rows completely matching in date and time but also two rows that differ in date and time within a predetermined range (e.g. within 6 hours) may be associated with each other. As another example, when the target table and the source table each have a latitude and longitude column and the mapping condition uses the latitude and longitude column, distance-based association such as associating rows in the case where the distance between two locations is within a predetermined range (e.g. within 5 Km) may be performed.

Following this, for each row in the target table, rows associated by map from among the rows selected by filter are reduced based on the reduction method designated by the third element (reduce). A vector including a value obtained for each row in the target table as a result of this reduction is a feature.

The descriptor creation unit 13 may generate a plurality of features using the generated feature descriptors. Thus, the descriptor creation unit 13 may function as a feature generation unit for generating features.

The storage unit 11 is realized by, for example, a magnetic disk device. The input unit 12 and the descriptor creation unit 13 are realized by a CPU in a computer operating according to a program (descriptor creation program). For example, the program may be stored in the storage unit 11, with the CPU reading the program and operating as the input unit 12 and the descriptor creation unit 13 according to the program. The functions of the information processing system may be provided in SaaS (Software as a Service) form.

The input unit 12 and the descriptor creation unit 13 may each be realized by dedicated hardware. The input unit 12 and the descriptor creation unit 13 may each be realized by general-purpose or dedicated circuitry. The general-purpose or dedicated circuitry may be composed of a single chip, or a plurality of chips connected via a bus. In the case where part or all of the components of each device are realized by a plurality of information processing devices, circuits, or the like, the plurality of information processing devices, circuits, or the like may be centralized or distributed. For example, the plurality of information processing devices, circuits, or the like may be realized in the form in which they are connected via a communication network, such as a client-server system or a cloud computing system.

Figure 3:
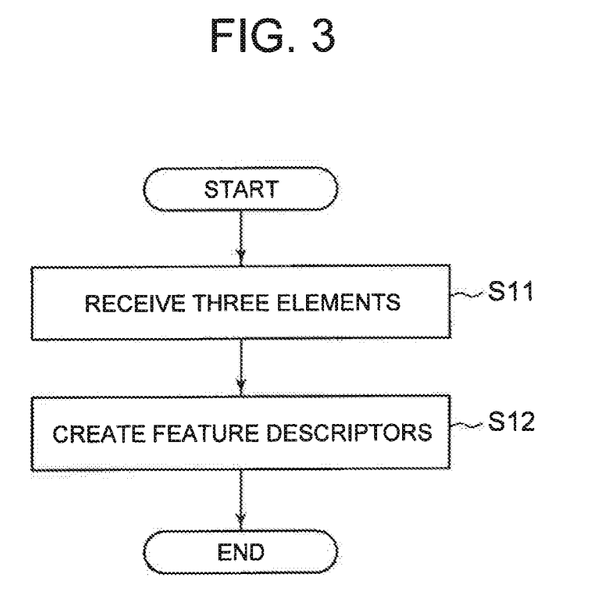
FIG. 3 is a flowchart depicting an example of the operation of the information processing system in Exemplary Embodiment 1.

The operation of the information processing system in this exemplary embodiment is described below. FIG. 3 is a flowchart depicting an example of the operation of the information processing system in this exemplary embodiment. The input unit 12 receives three elements necessary for creating feature descriptors (step S11). The descriptor creation unit 13 creates the feature descriptors from the input three elements (step S12). The input three elements each designate a column in the target table (first table) and/or the source table (second table) stored in the storage unit 11.

Figure 4:
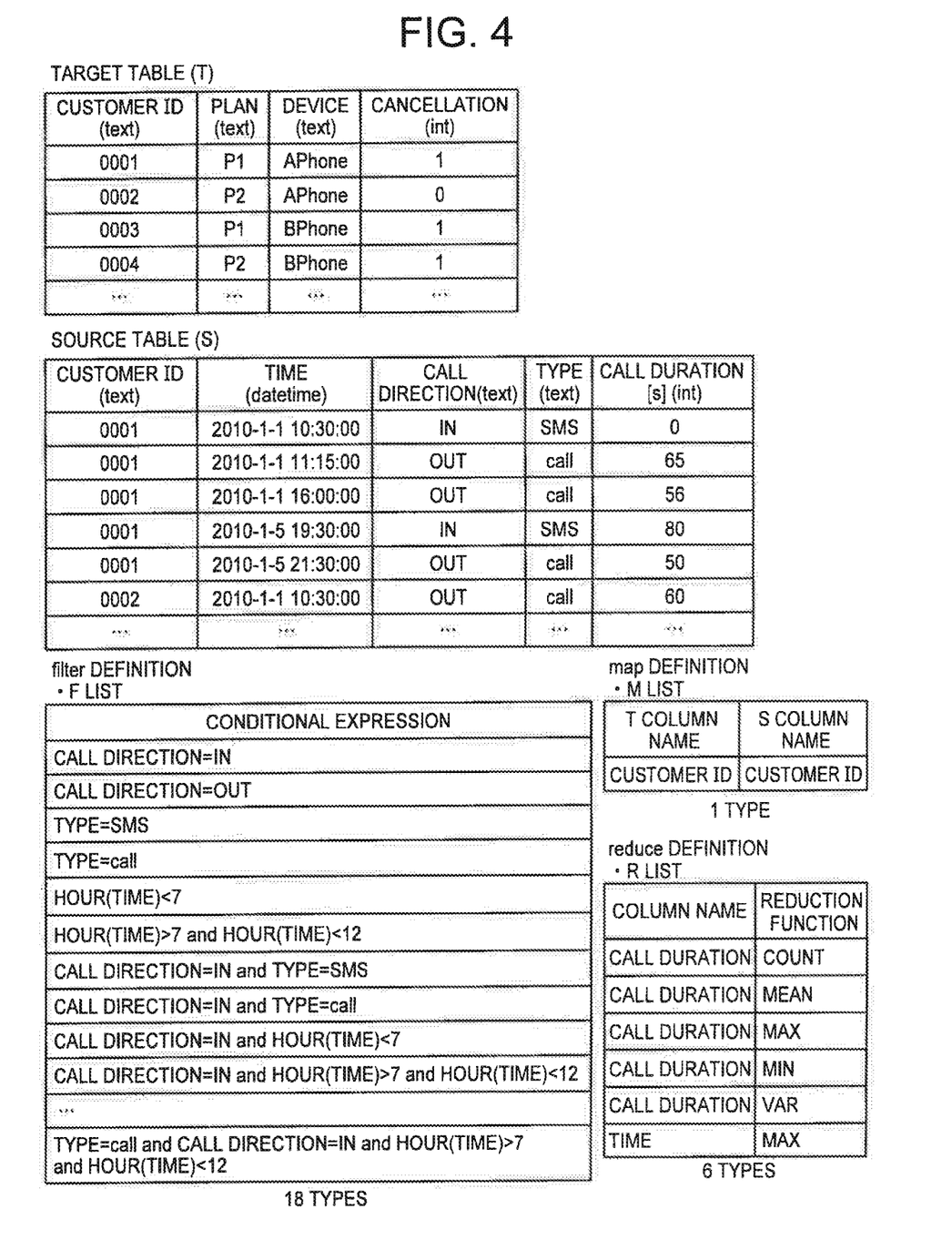
FIG. 4 is an explanatory diagram depicting an example of information used for creating feature descriptors.

A specific procedure according to which the descriptor creation unit 13 creates feature descriptors is described below. FIG. 4 is an explanatory diagram depicting an example of information used for creating feature descriptors. In the example depicted in FIG. 4, a variable (objective variable) of a prediction object is a variable indicating whether or not a customer makes cancellation, and the target table (T) is a table including a customer ID for identifying each customer and a variable indicating whether or not cancellation is made. The source table (S) is a table including a call log (e.g. call time, call direction, call type, and call duration) of each customer.

Suppose the F list used in filter includes 18 conditional expression candidates, the M list used in map includes one condition for associating the target table and the source table by customer ID, and the R list used in reduce includes six reduction functions relating to call duration or time.

The F list, the M list, and the R list may be automatically created by a machine, or manually created by a human. It is assumed here that the F list, the NI list, and the R list depicted in FIG. 4 are created beforehand.

Figure 5:
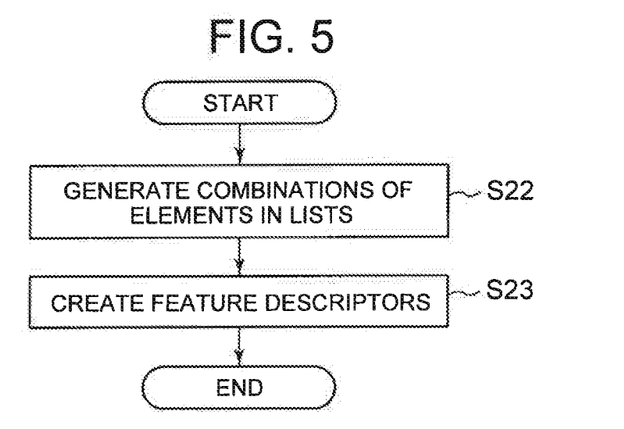
FIG. 5 is a flowchart depicting an example of operation of creating feature descriptors in Exemplary Embodiment 1.

FIG. 5 is a flowchart depicting an example of operation of creating feature descriptors by the descriptor creation unit 13 in this exemplary embodiment. First, the descriptor creation unit 13 selects one element from each of the F list, the M list, and the R list, and generates a combination of the elements (step S22). In the example depicted in FIG. 4, the F list includes 18 conditional expressions, the M list includes one mapping condition, and the R list includes six reduction methods. Accordingly, 108 combinations are generated from the elements in these lists.

The descriptor creation unit 13 then creates feature descriptors based on the generated combinations (step S23). In detail, the descriptor creation unit 13 converts the conditions and the reduction methods included in the generated combinations, into query language for operating or defining table data. For example, the descriptor creation unit 13 may use SQL as the query language.

Here, the descriptor creation unit 13 may create each feature descriptor, by applying the filtering condition, the mapping condition, and the reduction method to a template for generating an SQL statement. In detail, a template to which a condition and an reduction method are applied to generate an SQL statement may be prepared beforehand, and the descriptor creation unit 13 may apply a condition and an reduction method included in each of the generated combinations sequentially to the template to create an SQL statement. In this case, the feature descriptor is defined as the SQL statement, and the respective three elements selected from the F list, the M list, and the R list correspond to parameters for generating the SQL statement.

Figure 6:
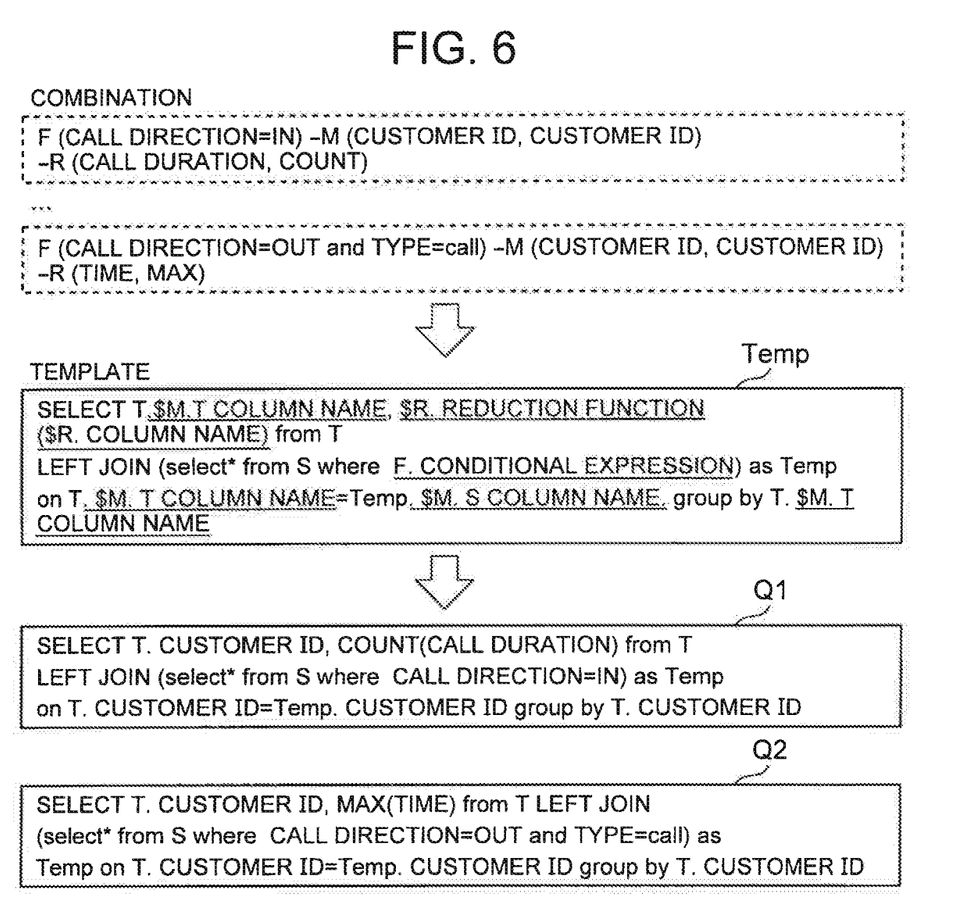
FIG. 6 is an explanatory diagram depicting an example of a process of generating an SQL statement.

FIG. 6 is an explanatory diagram depicting an example of a process of generating an SQL statement by application to a template. In the example depicted in FIG. 6, template Temp is prepared beforehand. The descriptor creation unit 13 applies a condition and a reduction method included in each generated combination, to the underlined parts in the template Temp. As a result, feature descriptors as many as the combinations are generated.

As an example, suppose a combination is generated by selecting the conditional expression "call direction=IN" from the F list, the mapping condition "association by customer ID" from the M list, and the reduction method "count call duration column" from the R list. When this combination is applied to the template Temp, query statement Q1 depicted in FIG. 6 is generated. A feature created by this query statement Q1 represents the total number of incoming calls or received messages.

As another example, suppose a combination is generated by selecting the conditional expression "call direction=OUT AND type=call" from the F list, the mapping condition "association by customer ID" from the M list, and the reduction method "time: maximum" from the R list. When this combination is applied to the template Temp, query statement Q2 depicted in FIG. 6 is generated. A feature created by this query statement Q2 represents the latest value of time at which a voice call is made.

Various features other than those described above can also be generated. For example, suppose a combination is generated by selecting the conditional expression "type=call AND call direction=OUT AND HOUR (time) <7" from the F list, the mapping condition "association by customer ID" from the M list, and the reduction method "call duration mean" from the R list. A feature created by this combination represents the average time of voice calls made before 7 o'clock.

Suppose a combination is generated by selecting the conditional expression "type=call AND call direction=IN" from the F list, the mapping condition "association by customer ID" from the M list, and the reduction method "call duration variance" from the R list. A feature created by this combination represents the variation in call time of incoming calls.

As described above, according to this embodiment, the descriptor creation unit 13 generates a combination of three elements, to generate a feature descriptor for generating a feature from the target table (first table) and the source table (second table). In detail, in this embodiment, a descriptor for generating a feature from the source table and the target table is defined by a combination of three elements, namely, filter, map, and reduce. By defining a feature descriptor by a combination of the three elements, many types of feature descriptors can be represented as simple element combinations. Thus, many feature candidates can be efficiently generated using a plurality of sets of table data. For example, in FIG. 4, 108 types of feature descriptors can be easily generated simply by defining 18 conditional expressions, one mapping condition, and six reduction methods. Moreover, since the definitions of filter, map, and reduce that have been created once can be reused, an advantageous effect of reducing the number of steps for generating feature descriptors can be obtained.

Exemplary Embodiment 2

Exemplary Embodiment 2 of an information processing system according to the present invention is described below. Exemplary Embodiment 1 describes the case where all conditional expressions indicated by the first element are prepared beforehand. For example, in FIG. 4, 18 conditional expressions are prepared in the F list. This embodiment describes a method of efficiently creating many conditional expressions indicated by the first element.

Figure 7:
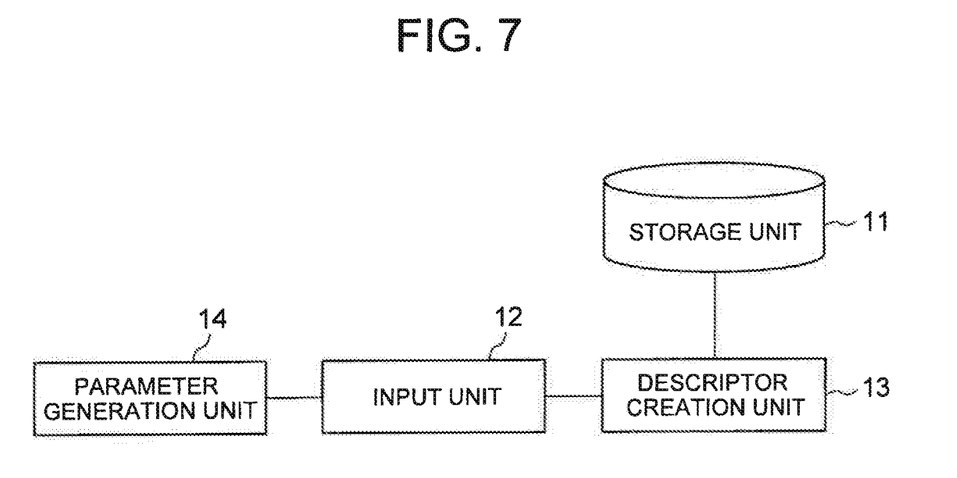
FIG. 7 is a block diagram depicting an example of the structure of Exemplary Embodiment 2 of an information processing system according to the present invention.

FIG. 7 is a block diagram depicting an example of the structure of Exemplary Embodiment 2 of an information processing system according to the present invention. The same components as those in Exemplary Embodiment 1 are given the same reference signs as in FIG. 1, and their description is omitted. The information processing system in this exemplary embodiment includes the storage unit 11, the input unit 12, the descriptor creation unit 13, and a parameter generation unit 14. The information processing system in this exemplary embodiment thus differs from Exemplary Embodiment 1 in that the parameter generation unit 14 is further included.

The parameter generation unit 14 generates a plurality of conditional expressions, each by combining conditional expressions (hereafter referred to as "atomic conditional expressions") included in the filtering condition indicated by the first element. The number of conditional expressions combined is set beforehand. The maximum number of atomic conditional expressions linked by AND is hereafter also referred to as "conditional expression maximum length". An atomic conditional expression may be represented by a single logical expression, or a logical expression obtained by joining a plurality of logical expressions by an operator.

Figure 8:
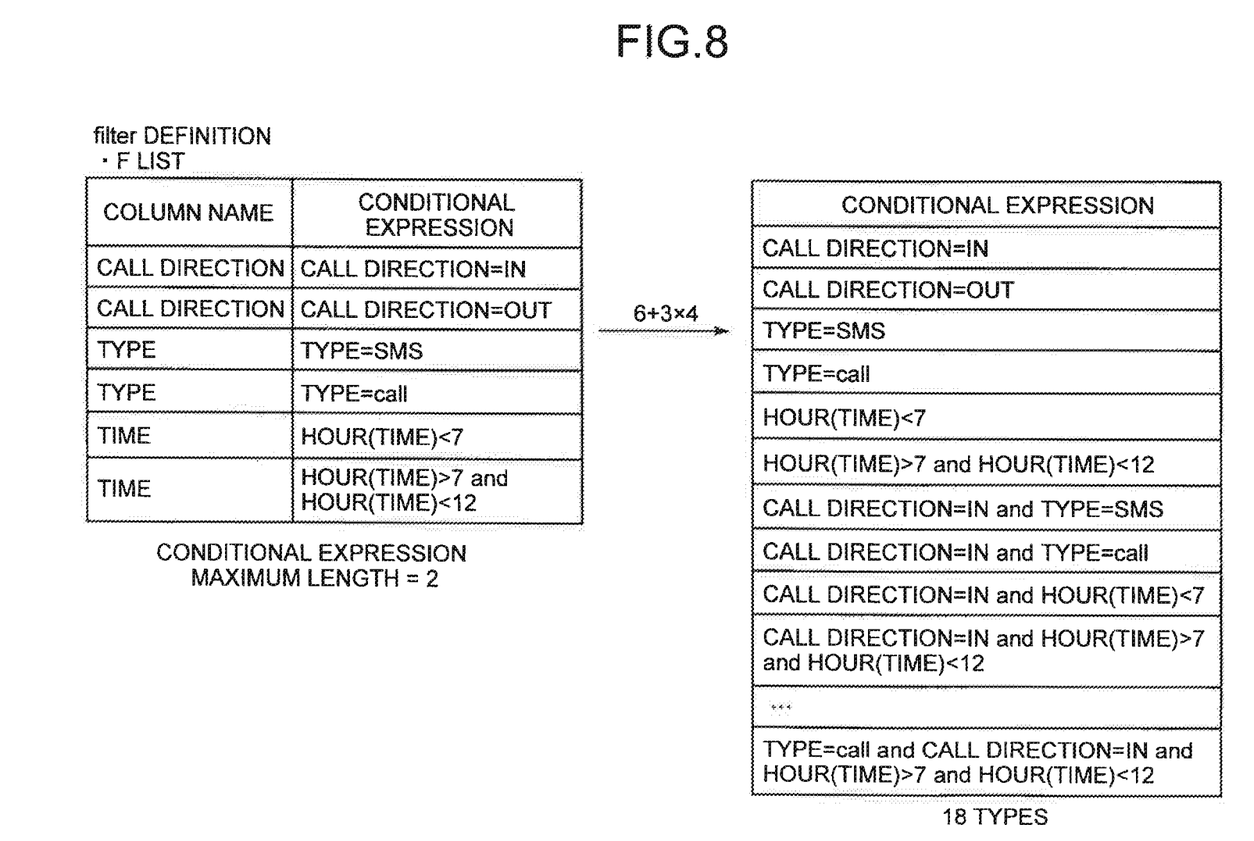
FIG. 8 is an explanatory diagram depicting an example of a process of generating a plurality of conditional expressions.

FIG. 8 is an explanatory diagram depicting an example of a process of generating a plurality of conditional expressions. In the example depicted in FIG. 8, the F list includes six atomic conditional expressions, and the conditional expression maximum length is 2. The descriptor creation unit 13 combines a number of atomic conditional expressions less than or equal to the "conditional expression maximum length" from among the atomic conditional expressions included in the F list, to generate a plurality of new conditional expressions. In FIG. 8, a total of 18 conditional expressions are generated from the F list.

In this embodiment, the parameter generation unit 14 combines atomic conditional expressions to generate new conditional expressions. Conditional expressions can be substantially combined up to the length corresponding to the number of atomic conditional expressions. However, such a long conditional expression obtained by joining all expressions is hard to be understood in its meaning by the user, and is often not practical. In this embodiment, the conditional expression maximum length is set to a range (e.g. conditional expression maximum length=2) in which the user can understand the meaning of a feature), so that the complexity of a generated feature can be reduced. Thus, by designating the conditional expression maximum length, a feature can be generated while limiting conditional expressions to those easily understandable by the user.

When generating a new conditional expression, the descriptor creation unit 13 may exclude any contradictory condition from among conditional expressions for the same attribute. For example, of the conditional expressions depicted in FIG. 8, the condition that the call direction is IN and the condition that the call direction is OUT are never compatible with each other. In this case, the descriptor creation unit 13 may exclude a combination including such conditions.

The input unit 12, the descriptor creation unit 13, and the parameter generation unit 14 are realized by a CPU in a computer operating according to a program (descriptor creation program). The input unit 12, the descriptor creation unit 13, and the parameter generation unit 14 may each be realized by dedicated or general-purpose hardware or circuitry.

Figure 9:
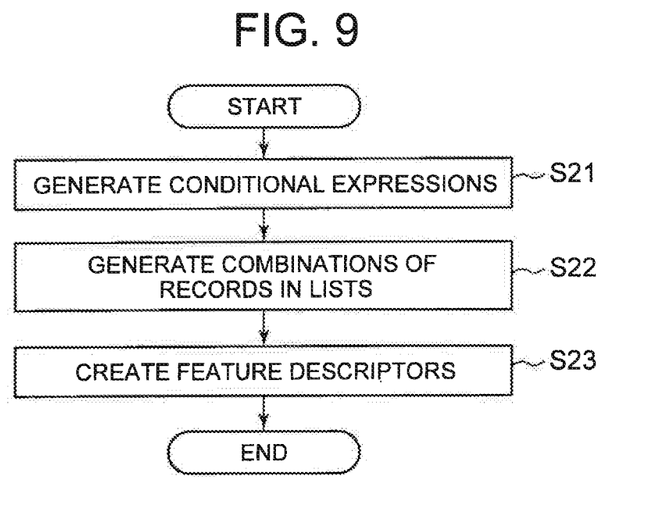
FIG. 9 is a flowchart depicting an example of operation of creating feature descriptors in Exemplary Embodiment 2.

FIG. 9 is a flowchart depicting an example of operation of creating feature descriptors by the descriptor creation unit 13 in this exemplary embodiment. First, the descriptor creation unit 13 generates new conditional expressions by combining the conditional expressions included in the F list (step S21). The subsequent process of creating feature descriptors based on the elements is the same as the process of steps S22 to S23 in FIG. 5.

As described above, according to this exemplary embodiment, the parameter generation unit 14 generates a plurality of conditional expressions, each by combining a number of atomic conditional expressions less than or equal to the number indicated by the designated maximum length. The descriptor creation unit 13 then creates feature descriptors, using each generated conditional expression as the first element. Hence, in addition to the advantageous effects of Exemplary Embodiment 1, many feature descriptors can be generated efficiently by designating fewer conditional expressions. For example, 108 types of feature descriptors can be easily generated simply by defining six conditional expressions and their conditional expression maximum length (e.g. maximum length=2), one mapping condition, and six reduction methods.

Exemplary Embodiment 3

Exemplary Embodiment 3 of an information processing system according to the present invention is described below. Exemplary Embodiment 1 describes the method of generating combinations of three elements (filter, map, reduce) to generate feature descriptors for generating features from the target table (first table) and the source table (second table). Exemplary Embodiment 3 describes a method of generating feature descriptors without performing the process (i.e. filter) of extracting a row from the second table (source table).

The structure in Exemplary Embodiment 3 is the same as that in Exemplary Embodiment 1, but the method of generating feature descriptors by the descriptor creation unit 13 in Exemplary Embodiment 3 differs from that in Exemplary Embodiment 1. The descriptor creation unit 13 generates feature descriptors using information input to the input unit 12, as in Exemplary Embodiment 1. In this embodiment, however, the descriptor creation unit 13 creates a plurality of feature descriptors, each by generating a combination of two elements (map, reduce), namely, the second element (i.e. mapping condition element) and the third element (i.e. reduction method element) described in Exemplary Embodiment 1.

In detail, the descriptor creation unit 13 in this exemplary embodiment creates a plurality of feature descriptors, each by generating a combination of a mapping condition element (corresponding to the second element in Exemplary Embodiment 1) indicating a mapping condition for rows in the first table (target table) and the second table (source table) and a reduction method element (corresponding to the third element in Exemplary Embodiment 1) indicating a reduction method for reducing, for each objective variable, data of each column included in the second table.

In Exemplary Embodiment 3, "reduction for each objective variable" means reducing, from a column included in the second table, data that is associated with the same column in the first table based on the mapping condition element.

The method of generating each combination of the elements by the descriptor creation unit 13, the contents of each element, and the contents of feature descriptors are the same as those in Exemplary Embodiment 1, except that the first element (i.e. filtering condition element) is not included as an element.

As described above, according to this embodiment, the descriptor creation unit 13 creates a plurality of feature descriptors, each by generating a combination of the mapping condition element and the reduction method element. This has the same advantageous effects as Exemplary Embodiment 1, that is, many feature candidates can be efficiently generated using a plurality of sets of table data. For example, in the case of using the whole second table data in the generation of features, there is no need to use a subset of the second table data, so that features can be generated from each set of table data even when the filtering condition element is not included in the feature descriptor.

Figure 10:
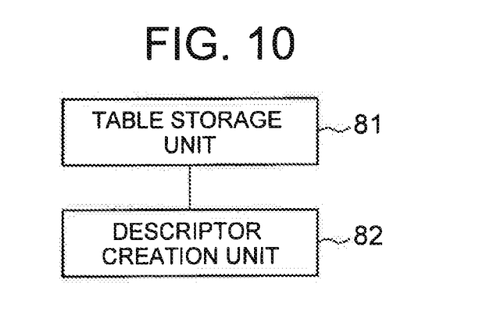
FIG. 10 is a block diagram depicting an overview of an information processing system according to the present invention.

An overview of an information processing system according to the present invention is described below. FIG. 10 is a block diagram depicting an overview of an information processing system according to the present invention. The information processing system according to the present invention includes: a table storage unit 81 (e.g. the storage unit 11) which stores a first table (e.g. the target table) including an objective variable and a second table (e.g. the source table) different in granularity from the first table; and a descriptor creation unit 82 (e.g. the descriptor creation unit 13) which creates a feature descriptor for generating a feature which is a variable that can influence the objective variable, from the first table and the second table.

The descriptor creation unit 82 creates a plurality of feature descriptors, each by generating a combination of a mapping condition element (e.g. the second element) indicating a mapping condition for rows in the first table and the second table and a reduction method element (e.g. the third element) indicating a reduction method for reducing, for each objective variable, data of each column included in the second table.

With such a structure, many feature candidates can be efficiently generated using a plurality of sets of table data.

The descriptor creation unit 82 may create the plurality of feature descriptors, each by generating a combination of a filtering condition element (e.g. the first element) including a conditional expression indicating a filtering condition for a row included in the second table, the mapping condition element (e.g. the second element) indicating the mapping condition for the rows in the first table and the second table, and the reduction method element (e.g. the third element) indicating the reduction method for reducing, for each objective variable, the data of each column included in the second table.

The information processing system may include a filtering condition generation unit (e.g. the parameter generation unit 14) which generates a plurality of conditional expressions, by combining atomic conditional expressions which are each a conditional expression included in the filtering condition indicated by the filtering condition element. Here, the filtering condition generation unit may generate the plurality of conditional expressions each obtained by combining a number of atomic conditional expressions less than or equal to a number indicated by a designated maximum length, and the descriptor creation unit 82 may create the feature descriptors, using each of the generated conditional expressions as the filtering condition element.

With such a structure, many feature candidates can be efficiently generated by designating fewer conditional expressions.

In detail, the descriptor creation unit 82 creates the feature descriptors each for performing a process of filtering one or more rows based on the filtering condition designated by the filtering condition element, a process of mapping the first table and the second table through the mapping condition designated by the mapping condition element, and a process of reducing rows in the second table based on the reduction method designated by the reduction method element.

The descriptor creation unit 82 creates the plurality of feature descriptors, each by selecting one filtering condition indicated by the filtering condition element, one mapping condition indicated by the mapping condition element, and one reduction method indicated by the reduction method element and combining the selected conditional expression, mapping condition, and reduction method.

For example, the filtering condition element is represented by a conditional expression for a column in the second table and a maximum length of the conditional expression, the mapping condition element is represented by a column pair associating a column in the first table and a column in the second table, and the reduction method element is represented by a reduction method performed for a column in the second table.

The feature descriptors may be each defined by an SQL statement extracting data from the first table and the second table. Here, the descriptor creation unit 82 may create the feature descriptors, each by applying the filtering condition, the mapping condition, and the reduction method to a template for generating the SQL statement.

Figure 11:
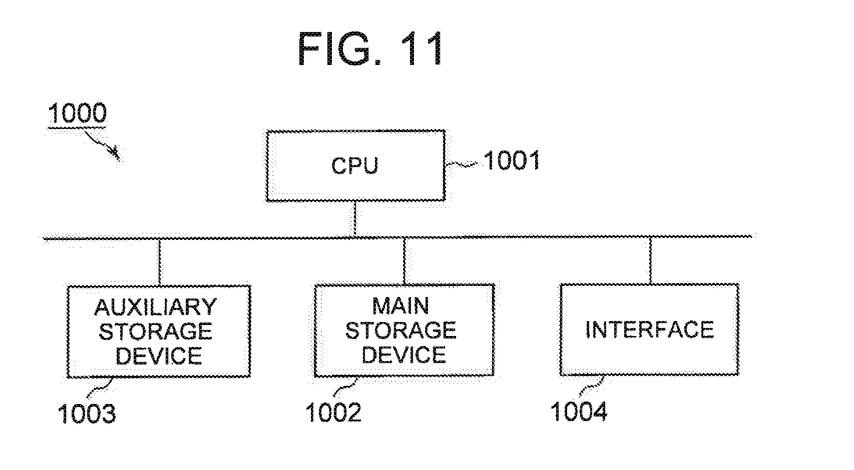
FIG. 11 is a schematic block diagram depicting the structure of a computer according to at least one exemplary embodiment.

FIG. 11 is a schematic block diagram depicting the structure of a computer according to at least one exemplary embodiment. A computer 1000 includes a CPU 1001, a main storage device 1002, an auxiliary storage device 1003, and an interface 1004.

The information processing system described above is implemented by the computer 1000. The operation of each processing unit described above is stored in the auxiliary storage device 1003 in the form of a program (descriptor creation program). The CPU 1001 reads the program from the auxiliary storage device 1003, expands the program in the main storage device 1002, and executes the above-mentioned process according to the program.

In at least one exemplary embodiment, the auxiliary storage device 1003 is an example of a non-transitory tangible medium. Examples of the non-transitory tangible medium include a magnetic disk, magneto-optical disk, CD-ROM, DVD-ROM, and semiconductor memory connected via the interface 1004. In the case where the program is distributed to the computer 1000 through a communication line, the computer 1000 to which the program has been distributed may expand the program in the main storage device 1002 and execute the above-mentioned process.

The program may realize part of the above-mentioned functions. The program may be a differential file (differential program) that realizes the above-mentioned functions in combination with another program already stored in the auxiliary storage device 1003.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

This application claims priority based on U.S. Provisional Application No. 62/259,896 filed on Nov. 25, 2015, the disclosure of which is incorporated herein in its entirety.

REFERENCE SIGNS LIST

11 storage unit
12 input unit
13 descriptor creation unit
14 parameter generation unit

The invention claimed is:

1. An information processing system comprising:
a computing device including a processor and a memory; and
a storage device in communication with the computing device, the storage device configured to store a descriptor creation program executable by the processor, the descriptor creation program including:
a table storage unit which stores a first table including an objective variable and a second table, wherein the first table and the second table each include a plurality of rows and a row of the first table has a non one-to-one relationship with multiple rows of the second table;
a descriptor creation unit, implemented by the processor, which creates, based on the first table and the second table, a plurality of feature descriptors,
wherein the descriptor creation unit creates each feature descriptor included in the plurality of feature descriptors based on a combination of a mapping condition element indicating a mapping condition for rows in the first table and the second table, a reduction method element indicating a reduction method for reducing data included in the second table; and
a feature generation unit, implemented by the processor, which generates a plurality of features by applying the plurality of feature descriptors to the first table and the second table.

2. The information processing system according to claim 1, wherein the descriptor creation unit creates the plurality of feature descriptors, by, for each feature descriptor generating a combination of a filtering condition element, the mapping condition element and the reduction method element, wherein the filtering condition element includes a conditional expression indicating a filtering condition for a row included in the second table.

3. The information processing system according to claim 2, wherein the descriptor creation program further includes:
a filtering condition generation unit, implemented by the processor, which generates a plurality of conditional expressions; by combining two or more atomic conditional expressions, wherein each atomic condition expression is included in the filtering condition indicated by the filtering condition element, wherein a number of the atomic conditional expressions is less than or equal to a designated maximum length, and
wherein the descriptor creation unit creates the plurality of feature descriptors, using each of the generated conditional expressions as the filtering condition element.

4. The information processing system according to claim 2, wherein the feature descriptors perform at least one of a process of filtering one or more rows based on the filtering condition designated by the filtering condition element, a process of mapping the first table and the second table through the mapping condition designated by the mapping condition element, and a process of reducing rows in the second table based on the reduction method designated by the reduction method element.

5. The information processing system according to claim 2, wherein the descriptor creation unit creates the plurality of feature descriptors, by selecting a filtering condition indicated by the filtering condition element, a mapping condition indicated by the mapping condition element, and a reduction method indicated by the reduction method element.

6. The information processing system according to claim 2, wherein the filtering condition element includes a particular conditional expression for a column in the second table and a maximum length of the conditional expression, the mapping condition element includes a column pair associating a column in the first table and a column in the second table, and the reduction method element includes a particular reduction method performed for a column in the second table.

7. The information processing system according to claim 1, wherein the feature descriptors are each defined by a SQL statement describing an operation for extracting data from the first table and the second table.

8. The information processing system according to claim 7, wherein the descriptor creation unit creates the feature descriptors, by applying the filtering condition, the mapping condition, and the reduction method to a template for generating the SQL statement.

9. A descriptor creation method comprising:
creating, from a first table including an objective variable and a second table, a plurality of feature descriptors, wherein the first table and the second table each include a plurality of rows and a row of the first table has a non one-to-one relationship with multiple rows of the second table;
wherein each feature descriptor in the plurality of feature descriptors is created based on a combination of a mapping condition element indicating a mapping condition for rows in the first table and the second table and a reduction method element indicating a reduction method for reducing data included in the second table; and
generating a plurality of features by applying the plurality of feature descriptors to the first table and the second table.

10. The descriptor creation method according to claim 9, wherein the plurality of feature descriptors are created using a combination of a filtering condition element including a conditional expression indicating a filtering condition for a row included in the second table, the mapping condition element, and the reduction method element.

11. The information processing system according to claim 1, wherein in response to the mapping condition element indicating one row in the first table corresponds to a plurality of rows in the second table, the reduction method provided by the reduction method element reduces the plurality of rows in the second table into one row.

12. The information processing system according to claim 2, wherein in response to the mapping condition element indicating one row in the first table corresponds to a plurality of rows in the second table that satisfy the filtering condition, the reduction method provided by the reduction method element reduces the plurality of rows in the second table into one row.

13. The information processing system according to claim 1, wherein the descriptor creation unit uses a main key corresponding to a column in the first table, as the mapping condition element.

* * * * *